G. P. CARROLL & F. N. ROEHRICH.
CHECK VALVE MECHANISM.
APPLICATION FILED APR. 15, 1913.

1,172,765.

Patented Feb. 22, 1916.
4 SHEETS—SHEET 1.

Witnesses:
John E. Rager
A. Worden Gibbs.

Inventors
George P. Carroll
Frank N. Roehrich

UNITED STATES PATENT OFFICE.

GEORGE P. CARROLL, OF BRIDGEPORT, CONNECTICUT, AND FRANK N. ROEHRICH, OF JERSEY CITY, NEW JERSEY; SAID ROEHRICH ASSIGNOR TO SAID CARROLL.

CHECK-VALVE MECHANISM.

1,172,765.  Specification of Letters Patent.  Patented Feb. 22, 1916.

Application filed April 15, 1913. Serial No. 761,173.

*To all whom it may concern:*

Be it known that we, GEORGE P. CARROLL and FRANK N. ROEHRICH, citizens of the United States, residing, respectively, at the city of Bridgeport, county of Fairfield, and State of Connecticut, and at the city of Jersey City, county of Hudson, and State of New Jersey, have jointly invented a new and useful Check-Valve Mechanism, of which the following is a specification.

Our invention relates to improvements in the means for actuating check valves, especially where such valves are used to control the outflow of heated ammonia gas from the stills of intermittent absorption refrigerating machines. Our purpose is to provide simple, efficient and economical means whereby a check valve, especially where so used, shall close absolutely tight as soon as the pressure on its outflow side begins to exceed the pressure on its inflow side, and shall open when such former pressure falls a little below such latter pressure. The means employed for accomplishing this purpose are disclosed in the accompanying drawings and in the description relating thereto. There are also certain detail improvements of construction as will also so appear.

Figure 1:
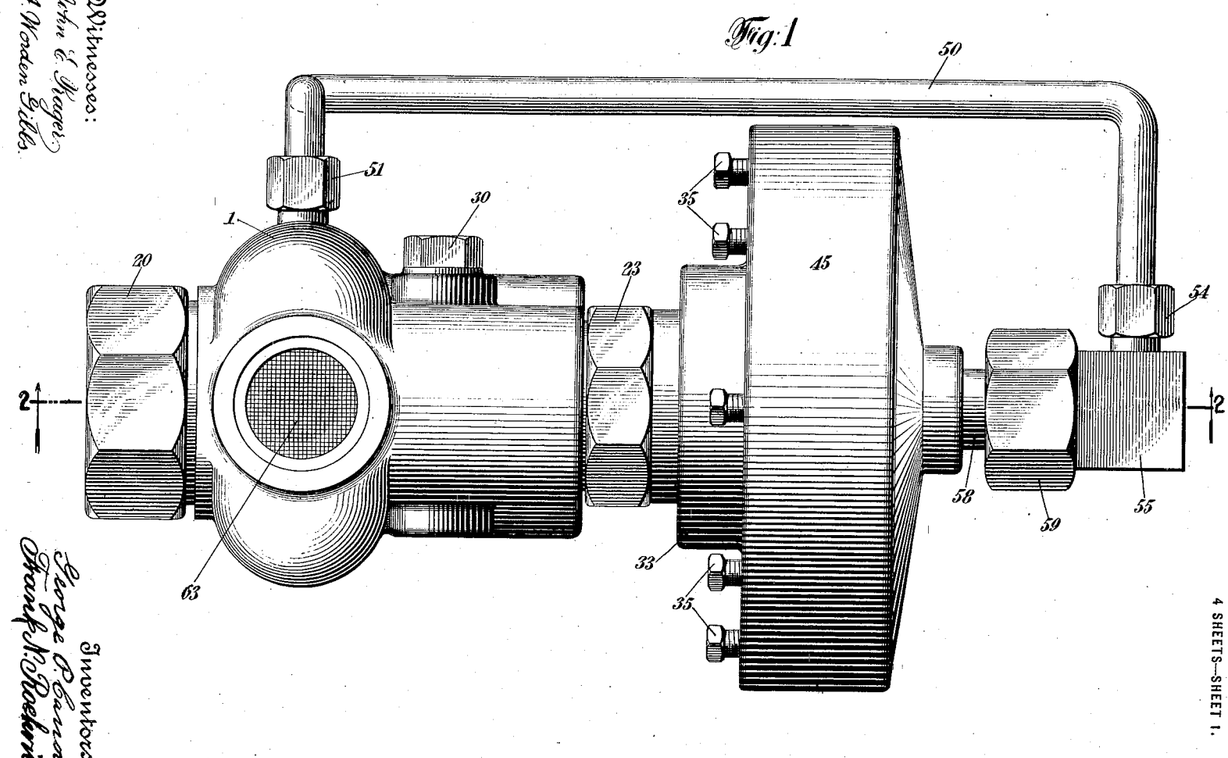
Figure 1 is a plan view of our invention.
Figure 2:
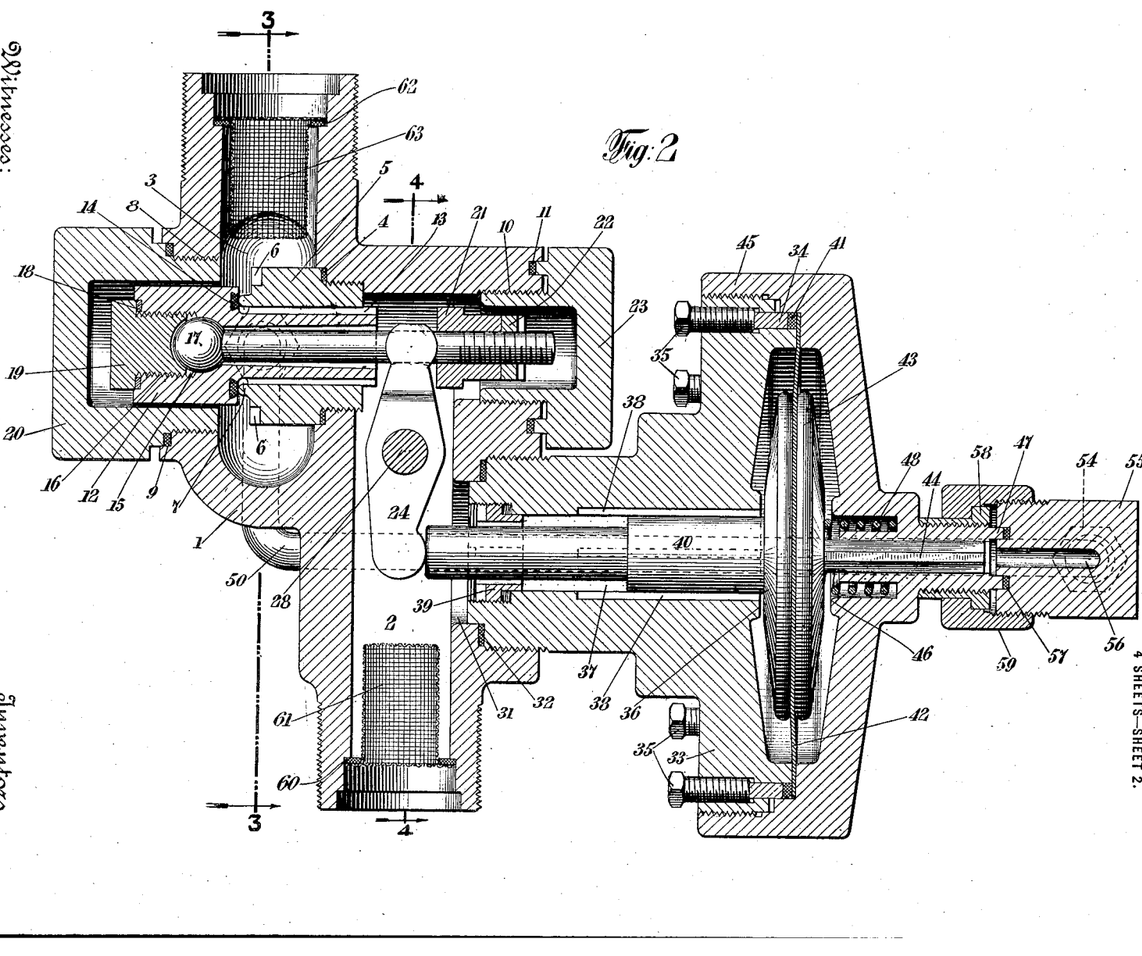
Fig. 2 is a vertical section through the line 2—2 of the preceding figure, looking upward, with some of the interior parts, however, shown in elevation.
Figure 3:
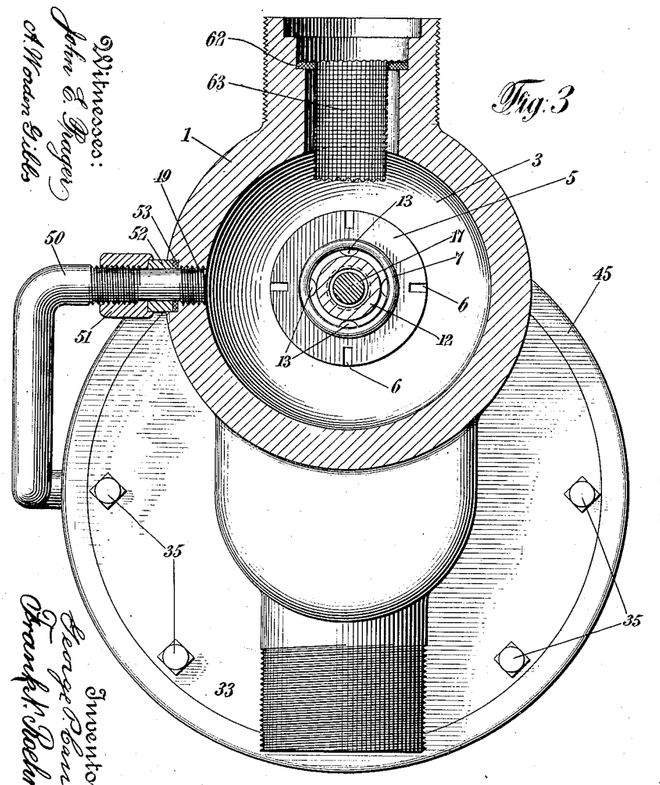
Figs. 3 and 4 are vertical sections through the lines 3—3 and 4—4, respectively, of Fig. 2 looking toward the right, with some of the interior parts, however, in each case shown in elevation.
Figure 4:
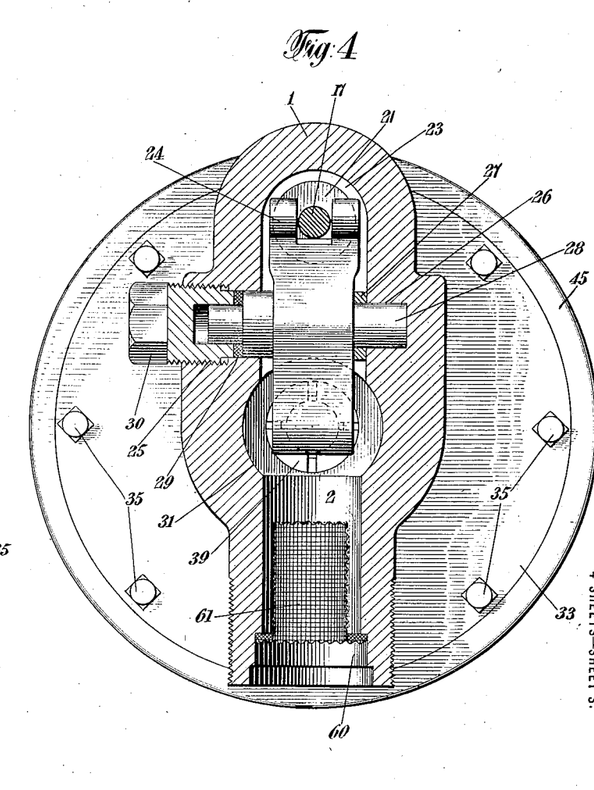

A main casing 1 has a vertical inlet passage 2, extending from the lower end of the casing upward and then horizontally to the left, as seen in Fig. 2, and an outlet passage 3, connecting near its lower end with the horizontal extension of the passage 2 and extending up through the top of the casing. The lower part of the passage 3 is in the form of a chamber of considerable diameter, as shown in Fig. 3. The casing 1 between the vertical part of the passage 2 and the passage 3 is internally threaded toward the passage 2 and has an annular gasket recess toward the passage 3. A gasket 4, preferably of lead, occupies the gasket recess of the casing 1. A seat piece 5 has, extending through it, a horizontal cylindrical opening; it has an externally threaded end screwing into the above described internally threaded part of the casing 1; it has a flanged end that compresses the gasket 4 when the piece is screwed into the casing; it has in its flanged end two opposed pairs of spanner wrench recesses 6; and it has projecting from its flange around its opening a highly convex valve seat 7. The passage 3, containing the larger part of the piece 4, including the seat 7, extends in the casing 1, a little below the piece so as to form a slight pocket.

The casing 1 has, as seen in Fig. 2, at the left of the passage 3, a threaded opening 8 in axial alinement with the opening through the piece 5, with an annular recess at its outer end adapted to receive a gasket 9, preferably of lead. Also as so seen, the casing 1 has, at the right of the passage 2, a threaded opening 10, in axial alinement with the opening through the piece 5, and an annular recess in the outer surface of the casing adapted to receive a gasket 11, preferably of lead. The piece 5 is inserted through the opening 8 and, by means of a spanner wrench inserted through the same opening, is screwed up so that its flange compresses the gasket 4, thus making a gas-tight joint.

A check valve member 12 has a cylindrical section, adapted to reciprocate freely within the opening through the piece 5, but having in its surface four longitudinal grooves 13, and an annular groove encircling the cylindrical section at the left end of the longitudinal grooves, whereby fluid may be transmitted from the passage 2 into the passage 3; it has to the left of its cylindrical section, as seen in Fig. 2, another section of enlarged diameter, in the right surface of which is an annular groove containing a ring 14, preferably of tin, adapted for seating on the seat 7; and it has a cylindrical opening extending from its right end into its enlarged section, there enlarging into a partially spherical cavity 15 and ending at the left in a threaded section 16 of larger diameter, with an annular gasket recess at its extreme outer end. A valve stem 17 has a spherical head occupying the cavity 15; it has a cylindrical rod part of less diameter than, and extending through, the cylindrical opening in the member 12; and it has a threaded section at its extreme right end. A gasket 18, preferably of lead, occupies the gasket recess in the member 12. A nut 19 screws into the threaded section 16; it has a concave cavity at its end fitting over the spherical head of the stem 17; and it has a flanged head screwing down upon and compressing the gasket 18. The parts 12, 14, 18 and 19 constitute one form of check valve and, in the description, will be hereinafter simply referred to as "the check valve". It is evident that, by this construction, no fluid can pass through the body of the check valve; that the stem 17, on being pulled to the right, is free to rotate slightly so as to close the valve tightly on the seat 7; and that the stem, on an opening of the valve by the pressure of fluid coming through the inlet 2, follows the valve.

A cap 20 has a threaded section that screws into the threaded opening 8 and it has a flange that bears upon and compresses the gasket 9 so as to tightly close the opening, there being, moreover, a space between the cap and the enlarged part of the check valve for the free passage of fluid through the passage 3. A nut 21 is screwed over the threaded right end of the stem 17 and extends into the passage 2. A lock nut 22, having a spanner wrench recess at its outer end, is also screwed over the end of the stem 17 to hold the nut 21 in place. A cap 23 has a threaded section that screws into the threaded opening 10 and has a flange with an annular tongue projecting from its surface that bears upon and compresses the gasket 11 so as to tightly close the opening, there being, moreover, a space between the cap and the nuts 21 and 22 and the stem 17 so as to permit the nuts and the stem to reciprocate freely.

A strong lever 24 has a cylindrical pivot opening passing through it, midway between its ends, and it has at the upper end a fork bearing against the nut 21 including between its branches a section of the stem 17. In the wall of the casing 1 back of the passage 2 is a cylindrical opening 25, in axial alinement with the opening through the lever 24, of larger diameter than that opening and threaded at its outer end. In the wall of the casing 1 in front of the passage 2 is a cylindrical recess 26, in axial alinement with the opening through the lever 24 and of the same diameter. An anti-friction ring 27 surrounds the opening 26 and in front is adjacent to the wall of the casing 1 and at back is adjacent to the lever 24. A pivot 28 has a cylindrical main section passing through the openings in the lever 24 and the ring 27 and supported at its front end in the recess 26; it has an enlarged collar section adjacent to the back of the lever 24 and supported in the opening 25; and it has a short back section of reduced diameter. A gasket 29, preferably of lead, surrounds the back section of the pivot 28 within the opening 25. A nut plug 30 screws into the opening 25 so as to compress the gasket 29 and to make a tight joint.

In the casing 1, below the opening 10, is another opening 31, with an annular enlargement for a gasket 32, preferably of lead, and threaded at its outer end beyond the gasket. A flanged diaphragm casing 33 is threaded around the outer circumference of its flange section; it has at its extreme right, to the right of the threaded section of its flange, a plane section of reduced diameter; it has an annular recess extending inward to the left from its section of reduced diameter and adapted to contain a packing ring 34; it has, passing from the left surface of its flange section into the annular recess, a number of, say eight, threaded bolt holes into which are screwed bolts 35 so as to bear against the ring 34; it has, at the right, a shallow diaphragm chamber with a raised stop rim 36 around its axial center; it has a cylindrical opening 37 passing from its right end within the rim 36 through to its left end and with a threaded enlargement at the left end of the opening; it has fluid transmitting grooves 38 extending from the right end of the rim 36 for most of the length of the opening 37; it is externally threaded near the left end of its hub section; and at its extreme left end it has a cylindrical end of much reduced diameter, so that the hub section of the casing screws into the threaded part of the opening 31 and compresses the gasket 32 and the cylindrical end projects into the unthreaded part of the opening 31. A guide ring 39, having a spanner wrench recess at its left end and fluid transmitting grooves extending along the length of its inner surface, is screwed into the threaded enlargement at the end of the opening through the casing 33.

A motor member 40 has a larger rod section extending with a reciprocating fit through the opening 37 for a distance, as measured from the rim 36, less than the length of the grooves 38, and a smaller rod section extending with a reciprocating fit through the ring 39, so as to bear against the lower end of the lever 24; and it has at its right end, within the diaphragm chamber of the casing 33, a flanged head, of wide diameter and with a plane right surface, the head being prevented from traveling too far to the left by the rim 36. A gasket 41, preferably of lead, surrounds the casing 33 at the section of reduced diameter in its flange and rests against the ring 34. A very thin diaphragm 42, preferably of vanadium steel, covers the gasket 41 and the adjacent part of the casing 33, surrounded by the gasket, and it is also adjacent to the plane right surface of the motor member 39. A flanged member 43 has a plane left surface, approximately of the same diameter as the plane right surface of the motor member 39, resting against the outer surface of the diaphragm 42 and it has a stem extending to the right from its axial center and having in its surface a fluid transmitting groove 44.

A casing 45 has, to the left, a shallow diaphragm chamber, containing the flanged member 43, of substantially the same diameter as the corresponding chamber of the casing 33 and with a raised stop rim 46, corresponding to the rim 36, for preventing an excessive outward movement of the flanged member 43; it has, beyond its diaphragm chamber, a plane annular surface adjacent to the diaphragm 42, so that the outer edge of the diaphragm is clamped between the casing 45 on one side and the gasket 41 and the extreme right surface of the casing 33 on the other side; it surrounds the outer edges of the diaphragm 42, the gasket 41 and the right end of the ring 34; it has, at its extreme left, an enlarged recess threaded for most of its length, as measured from the left, so as to screw around the flange section of the casing 33; it has, within the rim 46, an annular recess extending to the right and leaving at the center of the casing a hollow cylindrical section within which the stem of the flanged member 43 may reciprocate; and it has, at its extreme right, an externally threaded hub ending in a tongue 47, the hollow axial opening through the casing extending to the end of the tongue. A light helical compression spring 48 occupies the annular recess in the casing 45 and bears at one end against the casing and at the other end against the flanged member 43. The casing 45 is screwed as tightly as possible on to the casing 33 and then the bolts 35 are screwed down to compress the ring 34 upon the gasket 41. Thus leakage of fluid from one side to the other of the diaphragm 42 is effectually prevented.

The diameters of the flanges of the members 40 and 43 are relatively but little less than the diameters of the diaphragm chambers in which they are respectively positioned. This construction secures, as nearly as possible, a piston effect, the flexion of the diaphragm 42 occurring beyond the members 40 and 43. The areas of the members 40 and 43 in contact with the diaphragm 42 are also very much greater than the area of the cross section of the valve 12 and the ring 14 where they are adapted to close the opening through the piece 5.

Connecting with the passage 3, at about the level of the center of the seat 7, in the wall of the casing 1 is an opening 49, threaded at its inner end and counterbored at its outer end. A suitably bent pressure transmitting pipe 50, of small internal diameter, is externally threaded at its extreme ends and at a little distance from each end, with short plain sections of reduced diameter between each pair of its threaded sections. At one end of the pipe 50, a slightly recessed nut 51 is screwed back over both of the threaded sections, and around the intermediate plain section are placed a compressing ring 52, at the end toward the nut, and a gasket 53, preferably of lead, at the end away from the nut. This same end of the pipe 50 is then screwed into the opening 49 until the entire gasket 53 and a part of the ring 52 occupy the counterbored part of the opening. Then the nut 51 is screwed down upon the ring 52 so as to compress the gasket 53 and to make a gas tight joint. Similarly by means of a nut 54, and another compressing ring and gasket, the other end of the pipe 50 is connected into an opening in the back wall of an angle piece 55. This means of connecting two conduit ends is set forth and claimed in the application of the applicant Roehrich, Ser. No. 717,142, filed Aug. 26, 1912, entitled Ammonia pipe union. The piece 55 has an L shaped passage 56 extending from the opening in the back of the piece to the left end of the piece; and it has a deep groove, containing a gasket 57, preferably of lead, adapted to register with the tongue 47.

A flanged and internally threaded sleeve 58 fits into an internally threaded cup coupling 59 and has its flange within and resting against the end wall of the coupling, while the part of the sleeve of reduced diameter passes through and beyond the coupling. The sleeve 58, in place within the coupling 59, is screwed around the threaded hub of the casing 45 sufficiently far to leave exposed the tongue 47. After the sleeve 58 has been screwed in place, the coupling 59 is slipped to the left, the casing 45 and the piece 55 are brought together so that the tongue 47 enters the groove of the piece, and then the coupling is screwed up on the piece until the gasket 57 is sufficiently compressed to make a gas tight joint. This means of connecting the casing 45 and the piece 55 is set forth and claimed in the application of the applicant Roehrich, Ser. No. 732,049, filed Nov. 18, 1912, entitled Ammonia angle valve.

The lower end of the casing 1 has a counterbored recess in which is inserted a strainer support 60, covered on the upper side by wire gauze 61, to prevent foreign matter ascending into the casing. Similarly the upper end of the casing 1 has a counterbored recess in which is inserted a strainer support 62, covered on the lower side by a wire gauze 63, to prevent foreign matter descending into the casing. The lower and upper ends of the casing 1 are externally threaded for making any approved kind of pipe connections.

Figure 5:
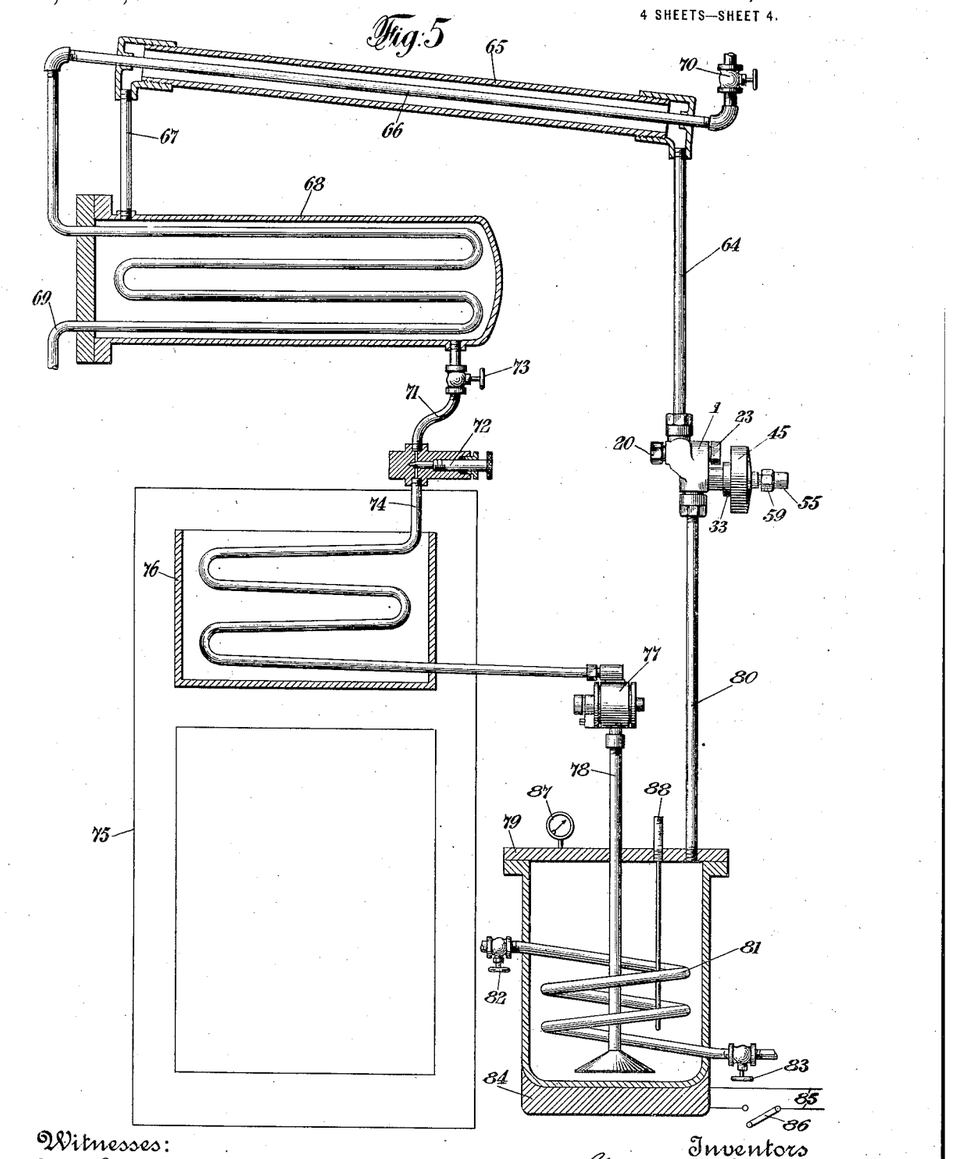
Fig. 5 represents our invention incorporated as a part of an intermittent absorption refrigerating machine, which, for convenience, is shown as non-automatic.

In Fig. 5, a suitably connected gas pipe 64 leads upward from the casing 1, the connection being with the top of the passage 3, into the lower end of the annular gas passage of a slightly declined dehydrator 65, containing a cooling water pipe 66, extending through the axial center of the dehydrator. From beneath the upper end of the dehydrator 65, a gas pipe 67 leads into the top of a condenser tank 68. A cooling water pipe 69 leads into the lower part of the tank 68, traverses the interior of the tank with several return bend connected pipe lengths, passes out of the tank near its top and leads into the upper end of the pipe 66. A valve 70, outside of the lower end of the dehydrator 65, is used to control the flow of water through the pipes 69 and 66. From the under side of the tank 68, a liquid pipe 71, leads to a regulator 72 and is intermediately controlled by a stop valve 73. From the regulator 72, an evaporator 74 leads through the top of a refrigerator 75, coils downward through a brine tank 76, in the upper part of the refrigerator, and passes outward to the right with a slight decline into a check valve structure 77. The structure 77 contains a valve preventing a back flow of refrigerant into the evaporator 74, as illustrated by the check valve 2ª or 2ᵇ in the patent to Carroll, No. 978,557, Dec. 13, 1910; and its peculiar features will be made the basis of a patent application by the applicant Roehrich, to be entitled Check valve mechanism.

From the under side of the structure 77, an expanded gas pipe 78 leads through the top of a casing 79, adapted to contain water as an absorbent, and flares outward at its termination near the bottom of the casing. From the top of the casing 79, a gas pipe 80 leads into the passage 2 and is suitably connected with the casing 1. A cooling water pipe 81 enters the casing 79 at one side, coils downwardly therein and emerges therefrom near the bottom. A shut-off valve 82 controls the inlet end of the pipe 81 and a regulating valve 83 regulates the outflow from the pipe. An electric heater 84 is attached to the bottom of the casing 79 and is provided with feed wires 85, controlled by an interposed switch 86. A pressure gage 87 is connected with the top of the casing 79 and a thermometer 88 has its stem extending through the top of the casing downward to a short distance from the bottom.

The method of operation is as follows: In the absorption period of the machine, especially as long as there is liquid ammonia in the tank 68, there is a pressure in the pipe 67, the dehydrator 65, the pipe 64 and the passage 3 that is exerted against the check valve so as to tend to close it. There is also a pressure in the pipe 50, the passage 56, the groove 44 and the diaphragm chamber of the casing 45 that is exerted against the flanged member 43 and the diaphragm 42 so as to tend to force the diaphragm inward, thus reinforcing the spring 48 with very much greater power. The pressure upon the diaphragm 42 also tends to force the motor member 40 inward against the lower end of the lever 24 and thus to force the upper end of the lever against the nut 21 in such a way as to force the check valve upon its seat with great tightness, the valve being closed as tightly as in case of a hand operated globe valve. With the construction of the parts as stated, the force exerted through the diaphragm 42 and tending to close the check valve is vastly greater than the force acting directly upon the valve and tending directly to close it. The valve 72, after having been adjusted so that, when the valve 73 is open, sufficient liquid ammonia will vaporize to frost that part of the evaporator 74 between the brine tank 76 and the side wall of the refrigerator 75, remains undisturbed. But the valve 73 is opened at the beginning of each absorption period, so that the ammonia, passing by the valve, vaporizes in the evaporator 74, chilling the brine in the tank 76, and passes in expanded condition through the structure 73 and the pipe 78 into the casing 79, where it is absorbed by the absorbent water. The valve 83 is also adjusted so that, while the valve 82 is open, the flow of water through the pipe 81 will keep the absorbent water and the absorbed refrigerant in the casing 79 at about 90°, as indicated by the thermometer 88. The valve 82 is opened at the same time as the valve 72, that is to say at the beginning of the absorption period. Assuming that the machine operates in atmospheric temperatures in excess of 45°, while there continues to be liquid ammonia in the tank 68 the gage pressure of the vapor in contact with the liquid is in excess of 65 pounds. At the beginning of an absorption period, the pressure in the tank 79, as indicated by the gage 87, is usually much below vacuum and at the end of the period seldom exceeds 35 pounds. There is therefore, throughout the normal absorption period, an abundant margin of pressure difference to keep the check valve tightly closed. If, on the other hand, for any reason, the absorption period should be unduly prolonged, until all the liquid ammonia in the tank 68 has been exhausted and until the pressure of the residual gas, in the tank and in its connections, has become the same as the pressure in the casing 79, then the spring 48 alone tends to keep closed the check valve. But in such case, with an equality of pressure on both sides of the valve, any leakage, if occurring, would do no harm. At the end of each absorption period, whenever occurring, the valves 73 and 82 are both closed and the water in the pipe 81 drains out. The switch 86 is closed and the heating of the saturated solution in the casing 79 begins. Soon the pressure in the casing 79 and the pipe 78 rises sufficiently to close the valve in the structure 77. The pressure of the ascending gas also is exerted through the pipe 80, the passage 2, the grooves of the ring 39 and the grooves 38 against the motor member 40 and the diaphragm 42. If the absorption period has been unduly prolonged, the pressure on the diaphragm 42 very quickly overcomes the spring 48; and pressure also is exerted through the grooves 13 so as to open the check valve and to cause the nut 21 and the lever 24 to force the motor member 40 to follow the diaphragm 42. But if the absorption period has had a normal duration, the gas pressure exerted upon the diaphragm 42 and the check valve must rise so much above the pressure of the vapor on the outer side of the diaphragm and the valve as to also overcome the spring 48 before the valve can open. When the check valve is once open, it remains open throughout the heating period. Soon after the beginning of the heating period, the valve 70 is opened to permit a flow of water through the pipes 69 and 66 sufficient to maintain a head pressure of say 125 to 160 pounds, as indicated by the gage 87. When the contents of the casing 79 have been heated say to 300°, as indicated by the thermometer 88, the heating period is terminated by opening the switch 86 and closing the valve 70. Enough heat, however, continues to pass from the heater 84 into the casing 79 to cause gas to pass upward, through the pipe 80 and the passage 2, with sufficient pressure to keep the check valve open for a little while longer. Soon, however, the pressure in the casing 79 begins to drop, and the spring 48 closes the check valve as the pressure below the valve approximates the pressure above it. The drop in pressure below the valve 12 proceeds very rapidly, after it has once begun, and the excess of pressure on the flanged member 43 and the diaphragm 42 simultaneously has the multiplying effect in closing the valve that has been previously explained. The contents of the casing 79 are allowed to cool down until the gage 87 indicates a vacuum, when another absorption period may be started.

While the operation of our invention has been explained as a part of an intermittent absorption refrigerating machine, it is evident that the mechanism would operate in the same manner under similar conditions of pressure variations.

Certain arrangements of the parts shown in Fig. 5 are set forth and claimed in the applications of the applicant Carroll, Ser. No. 595,453, filed Dec. 3, 1910, entitled Refrigerating machine, and Ser. No. 748,589, filed Feb. 15, 1913, entitled Refrigerating machine. The means for making a connection between the diaphragm 42 and the adjacent parts will be made the basis of a patent application by the applicant Roehrich, to be entitled Diaphragm and casing construction.

What we have invented and what we desire to have protected by Letters Patent is expressed in claims as follows:

1. In combination a chamber casing having an inlet, an outlet and a valve seat between them, a diaphragm forming one wall of said casing on the inlet side of said seat, a valve for closing said seat, means operating on an inward movement of said diaphragm to close said valve but on an outward movement thereof permitting fluid under pressure from said inlet to open the valve, and means permitting a pressure of fluid in said inlet, slightly in excess of the pressure of fluid in said outlet, to force said diaphragm outward, but in the absence of such excess forcing the diaphragm inward.

2. In combination a chamber casing having an inlet, an outlet and a valve seat between them, a diaphragm forming one wall of said casing on the inlet side of said seat, a valve for closing said seat, means operating on an inward movement of said diaphragm to close said valve but on an outward movement thereof permitting fluid under pressure from said inlet to open the valve, a device tending to close said valve, and a cover casing inclosing said diaphragm at its edge and having a passage connecting said outlet with the space outside of the diaphragm.

3. In combination a chamber casing having an inlet, an outlet and a valve seat between them, a diaphragm forming one wall of said casing on the inlet side of said seat, a valve for closing said seat, means operating on an inward movement of said diaphragm to close said valve but on an outward movement thereof permitting fluid under pressure from said inlet to open the valve, a cover casing inclosing said diaphragm at its edge and having a passage connecting said outlet with the space outside of the diaphragm, and a spring device in said cover casing tending to move said diaphragm inward.

4. In combination a chamber casing having an inlet, an outlet and a valve seat between them, a valve device tending to close said seat, and means permitting any excess of pressure in said outlet to have an intensive or cumulative effect in closing said seat and an excess of pressure in said inlet to overcome such tendency of said device and to open the seat.

5. In combination a chamber casing having an inlet, an outlet and a valve seat between them, a valve device tending to close said seat, and means permitting any excess of pressure in said outlet to have an intensive or cumulative effect on said device in closing said seat and an excess of pressure in said inlet to overcome such tendency of said device and to open the seat.

6. In combination a chamber casing having an inlet, an outlet and a valve seat between them, a valve device tending to close said seat, and means operating when the pressure in said outlet exceeds the pressure in said inlet to reinforce such tendency of said device but permitting a slight excess of pressure in the inlet to overcome such tendency and to open the seat.

7. In combination a chamber casing having an inlet, an outlet and a valve seat between them, a valve device tending to close said seat, and means causing an excess of pressure in said outlet to reinforce such tendency of said device but permitting a slight excess of pressure in said inlet to overcome such tendency and to open the seat.

8. In combination a chamber casing having an inlet, an outlet and a valve seat between them, a diaphragm forming one wall of said casing on the inlet side of said seat, a valve for closing said seat, means operating on an inward movement of said diaphragm to seat said valve but on an outward movement of the diaphragm permitting an excess of pressure in said inlet to open the valve, and means causing an excess of pressure in said outlet to force said diaphragm inward but permitting a slight excess of pressure in said inlet to force the diaphragm outward.

9. In combination a chamber casing having an inlet, an outlet and a valve seat between them, a diaphragm forming one wall of said casing on the inlet side of said seat, a valve for closing said seat, means operating on an inward movement of said diaphragm to seat said valve but on an outward movement of the diaphragm permitting an excess of pressure in said inlet to open the valve, a spring device tending to force said diaphragm inward, and means causing an excess of pressure in said outlet to reinforce such tendency of said device but permitting an excess of pressure in said inlet to overcome such tendency and to force said diaphragm outward.

10. In combination a main chamber casing having an inlet, an outlet and a valve seat between them, a diaphragm forming one wall of said casing on the inlet side of said seat, a lift valve for closing said seat from its outlet side, an outer casing clamping the circumference of said diaphragm and having a pressure transmitting passage communicating with said outlet, and means operating on an inward movement of said diaphragm to seat said valve but on an outward movement of the diaphragm permitting an excess of pressure in said inlet to open the valve.

11. In combination a main chamber casing having an inlet, an outlet and a valve seat between them, a diaphragm forming one wall of said casing on the inlet side of said seat, a lift valve for closing said seat from its outlet side, an outer casing seat from circumference of said diaphragm and having a pressure transmitting passage communicating with said outlet, a light spring device bearing upon the outer side of said diaphragm, and means operating on an inward movement of said diaphragm to seat said valve but on an outward movement of the diaphragm permitting an excess of pressure in said inlet to open the valve.

12. In combination a main chamber casing having an inlet, an outlet and a valve seat between them, a diaphragm forming one wall of said casing on the inlet side of said seat, a lift valve for closing said seat from its outlet side, an outer casing clamping the circumference of said diaphragm and having a pressure transmitting passage communicating with said outlet, a light spring device having a flange bearing upon and tending to force said diaphragm inward, a motor member having a flange adjacent to the inner side of said diaphragm, and means connecting said valve and said motor member whereby an inward movement of the member closes the valve and an outward movement of said diaphragm permits the pressure in said inlet to open the valve.

13. In combination a main chamber casing having an inlet, an outlet and a valve seat between them, a diaphragm forming one wall of said casing on the inlet side of said seat, a lift valve for closing said seat from its outlet side, an outer casing clamping the circumference of said diaphragm and having a pressure transmitting passage communicating with said outlet, a light spring device having a flange bearing upon and tending to force said diaphragm inward, a motor member having a flange adjacent to the inner side of said diaphragm, a stem piece adapted to close said valve, and a lever operating on an inward movement of said member to cause said piece to close said valve and on an outward movement of said diaphragm permitting the pressure in said inlet to open the valve.

14. In combination a main chamber casing having an inlet, an outlet and a valve seat between them, a diaphragm forming one wall of said casing on the inlet side of said seat, a lift valve for closing said seat from its outlet side, a stem extending from said valve through said seat, a nut upon said stem near its end away from said valve, a lever at one end bearing upon the face of said nut toward said valve, an outer casing clamping the circumference of said diaphragm and having a pressure transmitting passage communicating with said outlet, a light spring device having a flange bearing upon and tending to force said diaphragm inward, and a motor member at one end having a flange adjacent to the inner side of said diaphragm and at its other end bearing upon said lever so as to cause it to push said nut in a direction away from said seat on an inward movement of the diaphragm but so as to yield to a reverse movement of the lever on an outward movement of the diaphragm.

GEORGE P. CARROLL.
FRANK N. ROEHRICH.

Witnesses:
JOHN E. PRAGER,
WALTER L. MUEHLENBECK.